United States Patent [19]

Nomura

[11] Patent Number: 5,153,389
[45] Date of Patent: Oct. 6, 1992

[54] TWO STAGE ELECTROMAGNETIC BRAKING DEVICE FOR AN ELEVATOR

[75] Inventor: Masami Nomura, Inazawa, Japan

[73] Assignee: Mitsubishi Denki Kabushiki Kaisha, Japan

[21] Appl. No.: 588,821

[22] Filed: Sep. 27, 1990

[30] Foreign Application Priority Data

Sep. 28, 1989 [JP] Japan .................. 1-250757

[51] Int. Cl.⁵ .............................................. B66B 1/32
[52] U.S. Cl. .................................. 187/108; 187/109
[58] Field of Search .............. 187/108, 105, 119; 192/18 B; 318/743; 188/75, 171

[56] References Cited

U.S. PATENT DOCUMENTS

| | | | |
|---|---|---|---|
| 3,687,235 | 8/1972 | Mitsui et al. | 187/119 |
| 3,830,344 | 8/1974 | Cervenec et al. | 188/171 |
| 3,876,918 | 4/1975 | Komuro et al. | 318/743 |
| 3,896,925 | 7/1975 | Mitsui et al. | 188/171 |
| 4,132,292 | 1/1979 | Dufresne | 188/75 |
| 4,232,768 | 11/1980 | Dufresne | 192/2 |
| 4,319,665 | 3/1982 | Komuro et al. | 187/119 |
| 4,364,453 | 12/1982 | Serina | 187/105 |
| 4,576,262 | 3/1986 | Mohan et al. | 192/18 B |
| 4,975,627 | 12/1990 | Reddy | 187/108 |
| 4,982,815 | 1/1991 | Arabori et al. | 187/108 |
| 4,984,659 | 1/1991 | Nomura | 187/108 |

Primary Examiner—A. D. Pellinen
Assistant Examiner—Lawrence E. Colbert
Attorney, Agent, or Firm—Leydig, Voit & Mayer

[57] ABSTRACT

An electromagnetic brake for arresting the rotation of a driving shaft of an elevator includes a pair of brake shoes and a pair of plungers operated by separate solenoidal coils. Each plunger is in communication with a corresponding break shoe. A brake coil exciting circuit is provided for exciting the brake coils and differentiating the timing at which the excitations of the brake coils are attenuated, so that the brake shoes can be applied to the driving shaft intermittently.

17 Claims, 6 Drawing Sheets

FIG. I
PRIOR ART

TWO STAGE ELECTROMAGNETIC BRAKING DEVICE FOR AN ELEVATOR

BACKGROUND OF THE INVENTION

This invention relates to braking devices for an elevator wherein the riding comfort at the stopping periods, especially the riding comfort at the stopping times during the low speed inspection operations, is improved.

FIG. 1 is a schematic side view of a conventional electromagnetic braking device which is assembled integrally with the winding machine. FIG. 1 shows the state in which the movement of the brake wheel is arrested by the brake shoes. Thus, brake levers 50 are urged by springs 51 in the directions A, so that brake shoes 52 attached to the brake levers 50 bear on the brake wheel 53 to arrest the rotation thereof. The brake wheel 53 is fixedly mounted to the driving shaft 54 directly coupled to the electric motor (not shown) for driving the elevator cages; thus, the brake wheel 53 arrests the rotation of the motor and hence the operation of the elevator cages. In this state, L-formed cams 55 are rotated in the directions B, accompanying the movements of the brake levers 50 in the directions A, so as to push the plunger 56 upward.

When a current is supplied from a power source (not shown) to a brake coil 57 disposed around the plunger 56, the plunger 56 is attracted downward. Accompanying the downward movement of the plunger, the cams 55 are rotated in the directions C, so as to rotate the brake levers 50 in the directions of the arrows D. Accompanying these rotations, the brake shoes 52 release the brake wheel 53. As a result, the shaft 54 set free to be driven by the motor, to raise and lower the elevator cages.

Assuming that the air gap of the magnetic circuit at the plunger 56 is represented by x (see FIG. 1), the electromagnetic attraction force FP resulting from a current i flowing through the brake coil 57 is expressed approximately by the following equation:

$$FP = K1 \cdot (i^2/x^2) \quad (1)$$

where K1 is a constant of proportionality. On the other hand, the force FB by which the springs 51 urge the plunger 56 via the levers 55 and the cams 50 is also a function of the air gap x, which can be expressed by the following equation:

$$FB = F_0 - K2 \cdot x \quad (2)$$

wherein $F_0$ is the urging force of the springs 51 when x is equal to zero, and K2 is a constant of proportionality.

When the current i is fixed, the relations of FP and FB to the air gap x can be shown by a curve as shown in FIG. 2. In FIG. 2, the point a on the abscissa represents the magnitude of the air gap x at the position where the plunger 56 is attracted downward by the coil 57. In the gap between the points O and a, there is inserted a washer (not shown in FIG. 1) usually made of leather, for the purpose of quickening the operation of the plunger 56 and reducing the operation noises thereof. Thus, the point a is the position of the end of the plunger when the plunger 56 is attracted downward and the brake is thus released. The point b represents the position of the end of the plunger 56 when the brake shoes 52 are bearing on the brake wheel 53 to arrest the rotation thereof. The line FB represents the resilient force by which the plunger 56 is urged by the springs 51 at respective air gaps x. The curves FP1 through FP3 represent the electromagnetic attractions resulting from the braking coil currents i1 through i3, respectively.

Let us assume that the end of the plulnger 56 is at the point b during an elevator stop period; further assume that the brake coil excitation current increases to reach i1; then, the electromagnetic attraction acting on the plunger 56 overcomes the resilient force by which the plunger 56 is urged, so that the plunger 56 moves toward left in FIG. 2 (in the decreasing direction of the air gap x). The smaller the air gap x becomes, the stronger becomes the electromagnetic attraction of the plunger 56, as shown by the curve i1 in FIG. 2, the end of the plunger 56 thus moving rapidly to the point a. At the point a, the electromagnetic attraction acting on the plunger 56 is equal to a-c, which is sufficiently great with respect to the resilient force a-d, so that the electromagnetic brake is maintained stably in the released state. On the other hand, when the rotation of the driving shaft 54 of the elevator is to be arrested by the elelctromagnetic brake to stop the elevator cages, the current is decreased from i1 to i3. Then, the electromagnetic attraction acting on the plunger 56 is overcome by the resilient force of the springs, the plunger being thereby translated toward the right in FIG. 2 (in the increasing direciton of the air gap x). As the air gap x increases, the electromagnetic attraction becomes weaker, as shown by the curve i3 in FIG. 2, the end of the plunger 56 thus moving rapidly to the point b. At the point b, the braking force is approximately proportional to the resilient force b-f, since the electromagnetic force b-e counteracting it is small. Thus, even when the braking coil excitation current is decreased as slowly as possible, the braking force abruptly becomes approximately proportional to the resilient force b-f, so that the stops in low speed operations during inspections of the elevator or during imergency stops due to failures, tend to be abrupt.

The stopping operations during the usual automatic operations are effected, except in emergencies, by means of electric controls of the main motor for driving the elevator cages. The riding comfort during such automatic operations has been greatly improved thanks to the enhanced control performance realized by the recent advanced control technology. However, in spite of these recent advances, abrupt deceleration at the stops during the low speed operations is becoming even greater, because, first, the inertia of the motor shaft is becoming increasingly smaller, and second, it is necessary that the braking torque has a magnitude which overcomes the torque unbalance that may be caused under the overload condition. Thus, the braking torque cannot be made smaller than a predetermined magnitude. Consequently, the abrupt stops during low speed inspection operations of elevator cages have been inevitable. This not only results in the increased physical fatigue of the installment/inspection operators of the elevator, but also in safety problems of such operations.

SUMMARY OF THE INVENTION

It is therefore an object of this invention to provide an electromagnetic braking device which is capable of smoothly stopping the movement of the elevator cages during low speed operation or in emergencies where the aids of other stopping controls such as the electrical control of the driving motor of the elevator are absent.

The above object is accomplished according to the principle of this invention by an electromagnetic braking device which comprises at least two plungers capable of separate operations. Each one of the plungers is provided with a brake coil for providing a magnetic attraction force. An exciting circuit for exciting the brake coils differentiates the operation timings of the plungers, i.e., the timings at which the excitations of the coils (and hence the electromagnetic attractions acting on the plungers) cease so that the braking actions can begin. Thus, a plurality of braking mechanisms are operated successively with time lags therebetween.

More specifically, the electromagnetic braking device according to this invention comprises: a housing; arrestor means, mounted to the housing, for arresting the motion of the driving shaft of the elevator; at least two cylindrical plungers mounted within the housing to be axially translatable therein separately from each other; at least two solenoidal brake coils, each disposed around one of the plungers, for attracting the respective plungers disposed therein to translate the plungers separately in a predetermined axial direction; transmission means for transmitting the respective axial translations of the two plungers to said arrestor means, wherein the translations of the plunger caused by the attraction of the brake coils and transmitted by the transmission means to the arrestor means prevent said arrestor means from arresting the driving shaft of the elevator; and a brake coil exciting circuit for exciting the brake coils, wherein said brake coil exciting circuit differentiates the timings at which the excitations of the brake coils are attenuated, so that the timings at which the plungers cease preventing the arresting action of said arrester means are differentiated from each other.

It is preferred either (1) that the brake coil exciting circuit differentiates the currents supplied to the respective brake coils, thereby differentiating the timings at which the excitations of the brake coils are attenuated, or (2) that the brake coil exciting circuit differentiates the attenuation time constants of respective circuits including the brake coils, thereby differentiating the timings at which the excitations of the brake coils are attenuated. In the case of (2), the braking coil exciting circuit is preferred to comprise a resistor coupled via a contact switch across one of the brake coils for modifying an attenuation constant thereof.

BRIEF DESCRIPTION OF THE DRAWINGS

The novel features which are believed to be characteristic of this invention are set forth with particularity in the appended claims. This invention itself, however, both as to its organization and method of operation, together with further objects and advantages thereof, may best be understood from the detailed description of the preferred embodiments, taken in connection with the accompanying drawings, in which:

In the drawings, like reference numerals and characters represent like or corresponding parts.

DETAILED DESCRIPTION OF THE PREFERRED EMBODIMENTS

Referring next to the drawings, embodiments of this invention are described.

Figure 1:
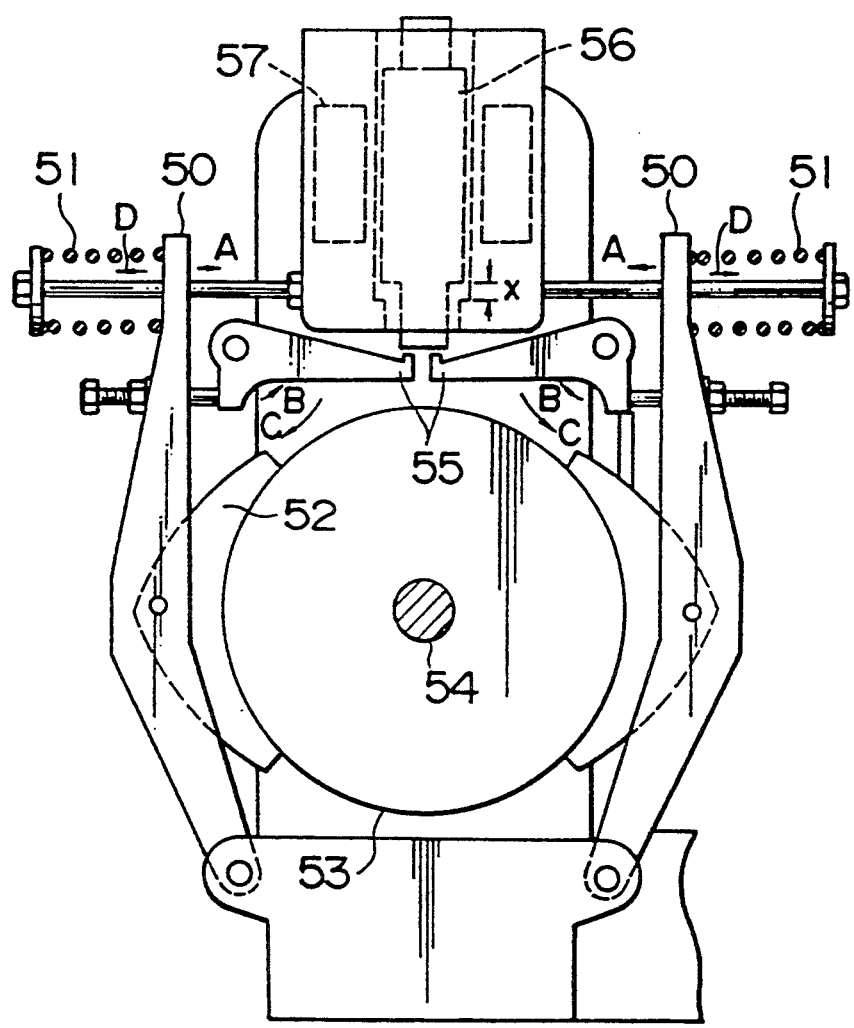
FIG. 1 is a schematic side elevational view of a conventional electromagnetic braking device.
Figure 2:
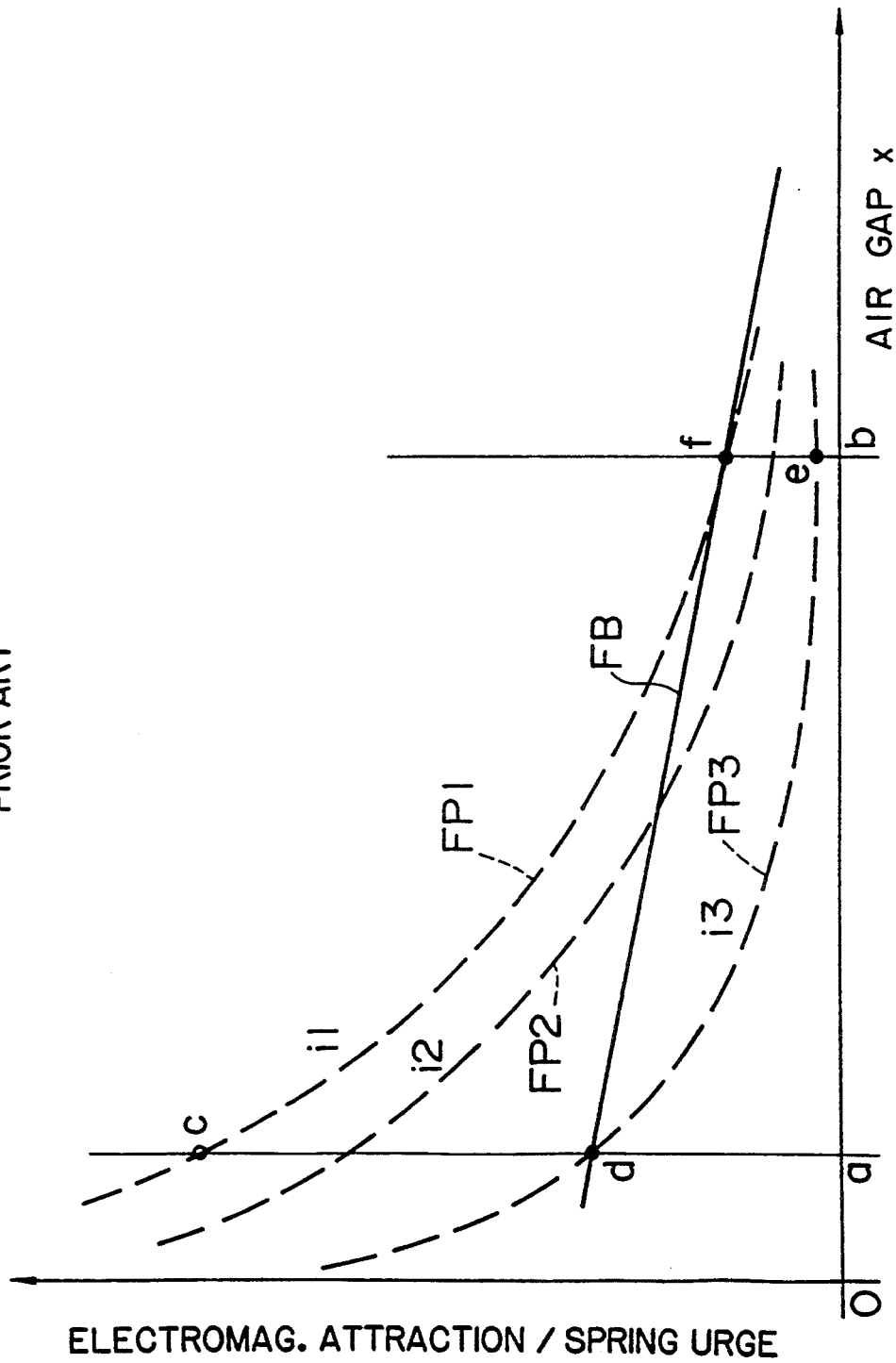
FIG. 2 is a graph which shows the relations between the air gap and the electromagnetic attraction/spring urging force of an electromagnetic braking device.
Figure 3:
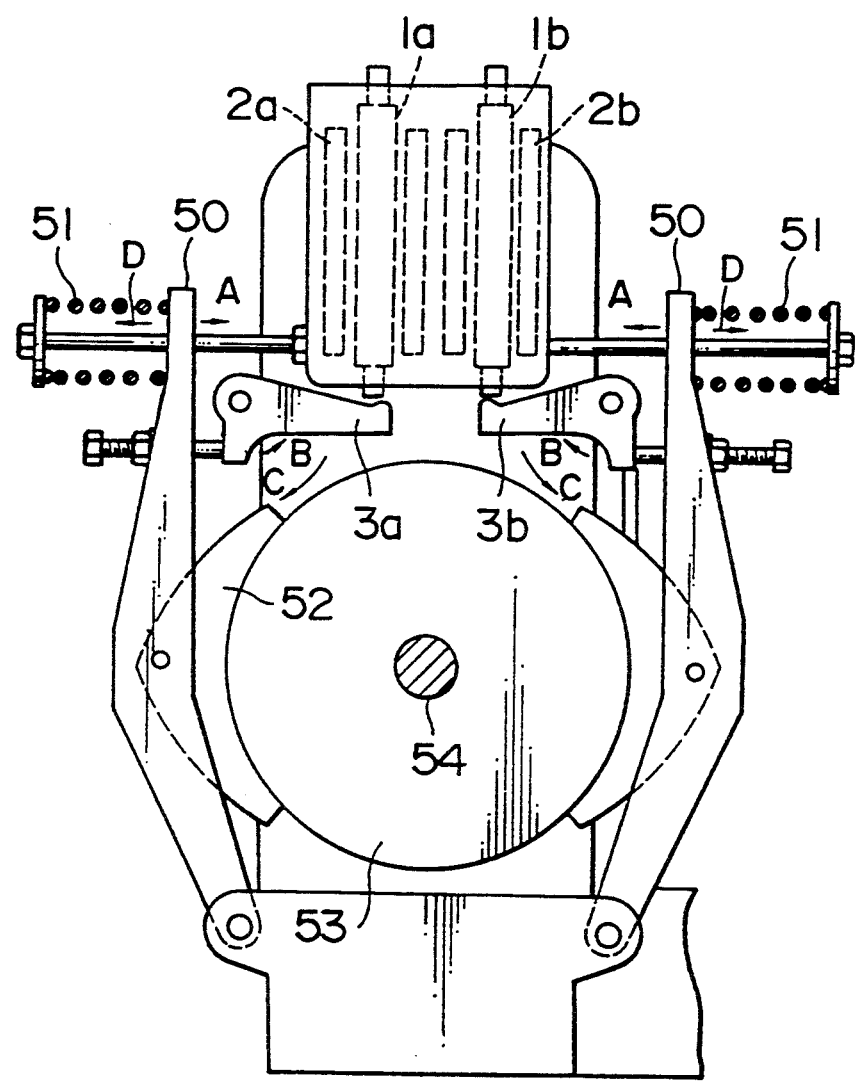
FIG. 3 is a view similar to that of FIG. 1, but showing an embodiment of this invention.

FIG. 3 is a schematic side view showing an electromagnetic braking device having a double braking mechanism according to this invention. A pair of cylindrical plungers 1a and 1b surrounded respectively by solenoidal brake coils 2a and 2b are axially translatably mounted to the housing of the brake within the coils 2a and 2b, respectively, to bear on the inner end portion of the horizontal arms of a pair of cams 3a and 3b rotatably supported on the housing of the braking device. The braking device according to this invention is characterized in that the operation timings of the two plungers 1a and 1b are differentiated from each other, as described in detail hereinafter. Otherwise, the structure and operation of the braking device is similar to those of FIG. 1 described above.

Thus, when the brake is arresting the motion of the driving shaft 54 as shown in FIG. 3, the two brake levers 50 rotatably mounted to the housing of the braking device at the lower end thereof are urged by helical springs 51 in the directions A, so that the two brake shoes 52 attached to the brake levers 50 bear on the brake wheel 53 to arrest the rotation thereof. The brake wheel 53 is fixedly mounted to the driving shaft 54 directly coupled to the shaft of the electric motor (not shown) for driving the elevator cages; thus, the brake wheel 53 arrests the rotation of the motor and hence the operation of the elevator cages. In this state, L-formed cams 3a and 3b are rotated in the directions B, accompanying the movements of the brake levers 50 in the directions A, so as to push the two plungers 1a and 1b upward.

When an excitation current is supplied from a power source (not shown) to the brake coils 2a and 2b disposed around the plungers 1a and 1b, respectively, the plunger 1a and 1b are attracted downward. Accompanying the downward movements of the plungers 1a and 1b, the cams 3a and 3b are rotated in the directions C, so as to rotate the brake levers 50 in the directions of the arrows D. Accompanying these rotations, the brake shoes 52 release the brake wheel 53. As a result, the shaft 54 is set free to be driven by the motor, to raise and lower the elevator cages.

Figure 4:
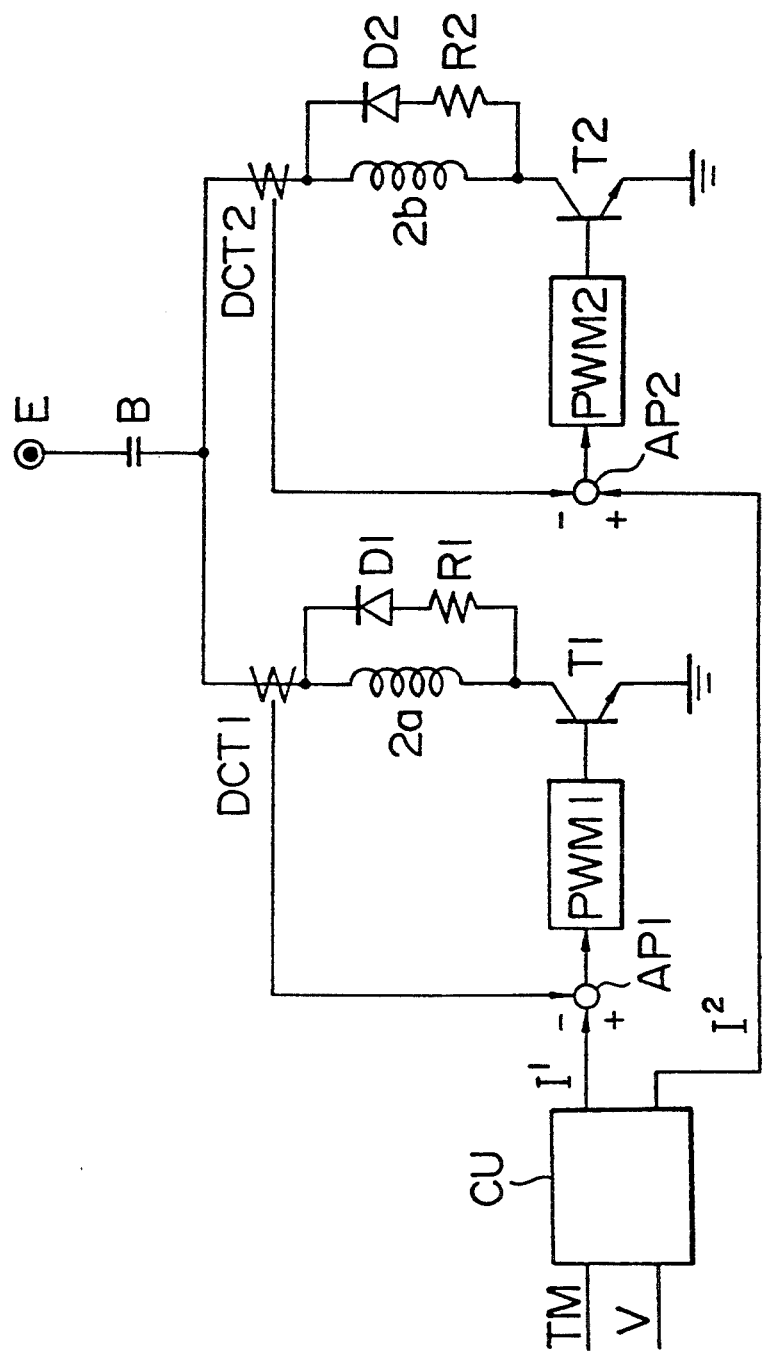
FIG. 4 is a circuit diagram of an implementaion of the brake coil exciting circuit.

FIG. 4 is a circuit diagram showing an implementation of the brake coils exciting circuit for differentiating the operation timings of the two plungers. A DC power source E is coupled to a contact B which is closed during brake release times and opened during brake activation times. Current detectors DCT1 and DCT2 detect the currents through the brake coils 2a and 2b, respectively, for feeding back the brake coil currents to the control circuits PWM1 and PWM2, respectively, which control the switching operations of the respective transistors T1 and T2 on the basis of the comparisons of the current command values of the brake coils 2a and 2b (from the control unit CU) with the actual current values detected by the current detectors DCT1 and DCT2. The control unit CU forms, in response to the operation mode TM of the elevator and the operation velocity V thereof, the current command values $I^1$ and $I^2$ to be passed through the brake coils $2a$ and $2b$.

Thus, across the DC power source E and the earth is formed, via the contact B, a first serial circuit consisting of the current detector DCT1, the brake coil $2a$, and the collector-to-emitter circuit of the transistor T1. A second serial circuit, coupled in parallel with the first serial circuit, comprises the current detector DCT2, brake coil $2b$, and the collecttor-to-emitter circuit of the transistor T2. Further, in parallel with the brake coil $2a$ is coupled a third serial circuit consisting of a diode D1 and the resistor R1 for adjusting the attenuation time constant of the coil $2a$. Similarly, in parallel with the brake coil $2b$ is coupled a fourth serial circuit consisting of a diode D2 and the resistor R2 for adjusting the attenuation time constant of the coil $2b$. The bases of the transistors T1 and T2 are coupled to the output sides $I^1$ and $I^2$ of the control unit CU via the control circuits PWM1 and PWM2 and the addition points AP1 and AP2, respectively. The secondary or detection sides of the current detectors DCT1 and DCT2 are coupled to the addition points AP1 and AP2, respectively.

Figure 5:
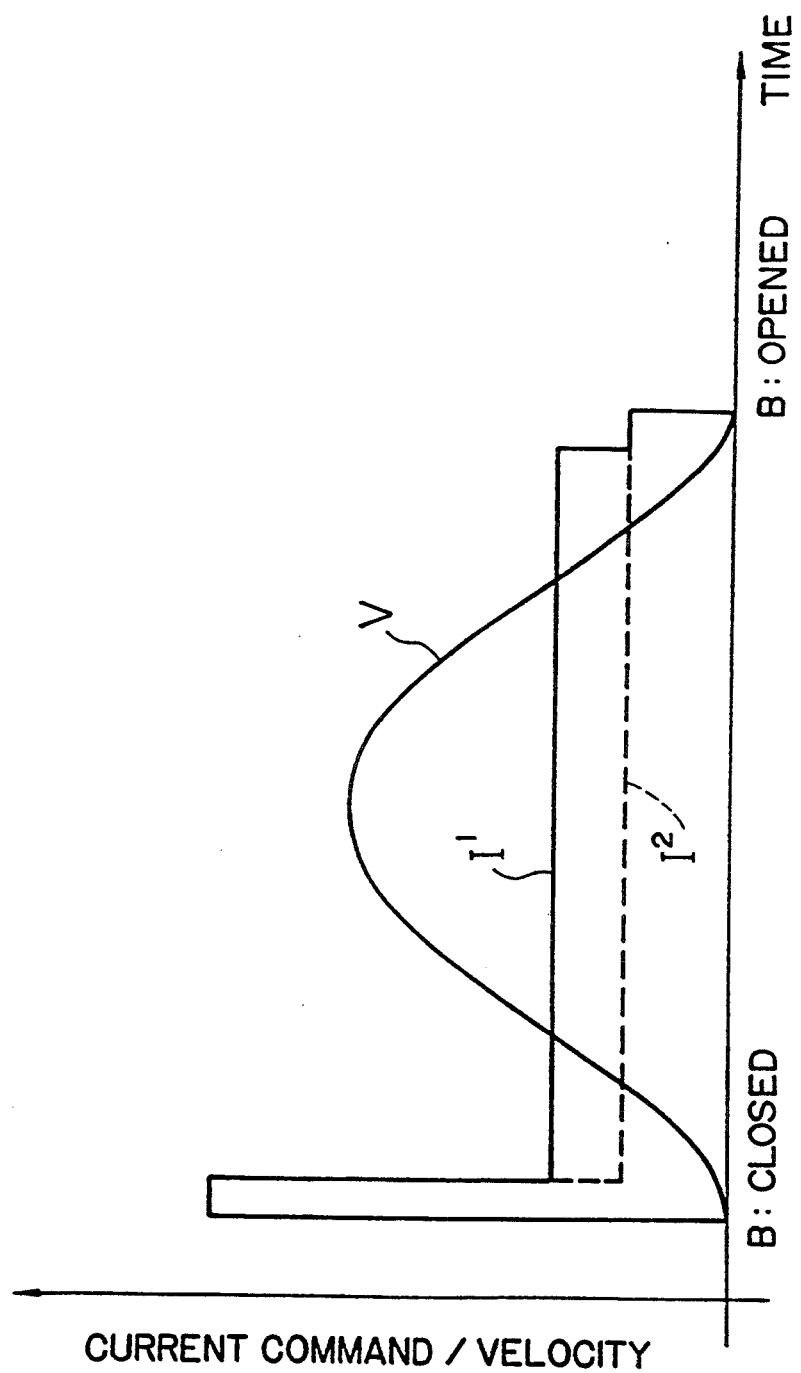
FIG. 5 is a graph which shows the relations between the time and the current command values/elevator cage velocity according to the circuit of FIG. 4.

Next, the operation of the braking device according to this invention, especially the method by which the activation timings of the two brake shoes 52 are differentiated, is described by reference to FIGS. 3 through 5, wherein FIG. 5 is a view showing the relations between the time and the current command values from the command unit CU which correspond to the elevator velocity.

At the starting time of the elevator cages, irrespective of whether the operation is a normal automatic one or for an inspection, upon the closure of the contact B there are outputted from the control unit CU the current command values $I^1$ and $I^2$ which are great enough for attracting the plungers $1a$ and $1b$ as shown at the left end portion in FIG. 5. Thus, in accordance with the differences between respective current command values and the feedback currents from the current detectors DCT1 and DCT2, the control circuits PWM1 and PWM2 operates the transistors T1 and T2, respectively. As a result, the brake coils $2a$ and $2b$ are excited simultaneously via the transistors T1 and T2, and the plungers $1a$ and $1b$ are attracted downward simultaneously, to rotate the cams $3a$ and $3b$ in the directions C (see FIG. 3) and thus to move the brake shoes 52 away from the brake wheel 53. Hence, the electromagnetic brake is released and the elevator cages start. When the plungers $1a$ and $1b$ are once attracted to the downward end, the brake coil excitation currents are reduced to predetermined differentiated levels $I^1$ and $I^2$, as shown at the middle portion in FIG. 5, which are greater than the holding currents for maintaining the plungers $1a$ and $1b$ in the state in which they are attracted to the bottom positions thereof. At the stop time, the contact B is opened. We assume that the attenuation time constant adjustment resistors R1 and R2 are assumed to have the same values. Then, the lengths of the activation times that pass before the excitation currents through the coils $2a$ and $2b$ are attenuated to let the plungers $1a$ and $1b$ move upward after the opening of the contact B and they become longer as the currents flowing through the brake coils $2a$ and $2b$ become greater. Thus, when the contact B is opened at the inspection operation stop times or at the automatic operation emergency stop times, the operation times of the two plungers $1a$ and $1b$ (i.e., the lengths of time the excitation currents through the coils $2a$ and $2b$ are attenuated) are differentiated, so that the brake shoes 52 bear on the brake wheel 53 at different timings from the right and the left. Thus, the braking is softened and stopping deceleration is smoothed.

During automatic operations of the elevator, the stopping control of the elevator cages from the normal deceleration stage to the complete stop is effected with smoothness by means of electric braking effected by the electric motor; thus, if, in the case of the drum type brake—for the purpose of suppressing the mechanical stresses acting on the driving shaft—the current command values of the two brake coils $2a$ and $2b$ are set equal when the cage velocity becomes under a predetermined value, then, upon opening of the contact B at the cage stop time, the two plungers $1a$ and $1b$ are operated simultaneously, so that the brake shoes 52 are pressed on the brake wheel 53 simultaneously to arrest the movement thereof. In such cases, the cage is already stopped when the brake shoes bear on the brake wheel, so that no stopping abruptness results from the electromagnetic braking device. It should be noted that the cage velocity at which the current command values of the two brake coils $2a$ and $2b$ are set equal to each other should be less than the velocity during the inspection operation.

Further, by alternating the current command values $I^1$ and $I^2$ of the two plungers $2a$ and $2b$, the temperature rises of the two brake coils $2a$ and $2b$ can be balanced. As described above, at the inspection operation stops and the automatic operation emergency stops, the plungers $1a$ and $1b$ are differentiated in operation timings thereof. Thus, in the case of a drum-type brake, the driving shaft is acted on by a lateral force during the brake activation time, which is clearly not preferable. However, the number of such operations is small, and forces act simultaneously both from the right and the left during the normal automatic operations which are by far the greater part of operations. Thus, there is no practical problem with regard to the mechanical stress acting on the driving shaft.

Figure 6:
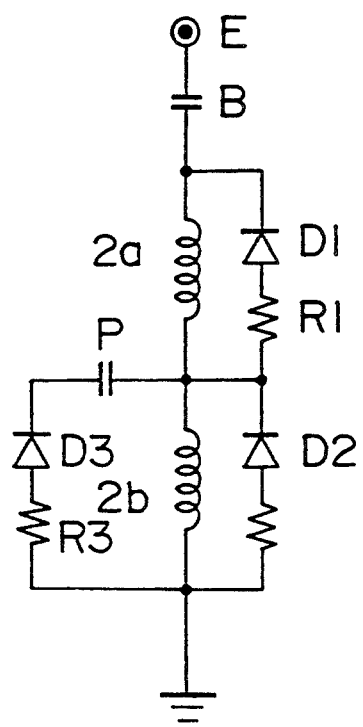
FIG. 6 is a circuit diagram of another implementation of the brake coil exciting circuit.

FIG. 6 is a circuit diagram showing another implementation of the brake coil exciting circuit for differentiating the operation timings of the two plungers (i.e., the timings at which the exciting currents flowing through the brake coils are attenuated). A DC power source E is coupled to a contact B which is closed when the brake is released and is opened when the brake is activated. A contact P is closed during inspection operations, etc. Across the DC power source E and the earth are coupled serially the contact B and the brake coils $2a$ and $2b$, wherein the serial circuit of the diode D1 and the attenuation time constant adjustment resistor R1 is coupled across the two terminals of the brake coil $2a$, and the serial circuit of diode D2 and the attenuation time constant adjustment resistor R2 is coupled across the two terminals of the brake coil $2b$. Further, the contact P, the diode D3, and the attenuation time constant adjustment resistor R3 are coupled serially to form the attenuation time constant modification circuit coupled across the brake coil $2b$.

Next, the operation of the circuit 6 is described by reference to FIGS. 3 and 6. First, at the start of the elevator cage, irrespective of whether the elevator operation is normal or for inspections, the brake coils $2a$ and $2b$ are excited simultaneously upon closure of the contact B, so that the plungers $1a$ and $1b$ are attracted simultaneously to the bottom end positions thereof, to release the electromagnetic brake. The elevator cage thus starts its operation. At the stop periods, the contact P is opened during normal operations, such that—we assume that the attenuation time constant adjustment resistors R1 and R2 have the values at which the attenuation time lengths of the currents flowing through the brake coils 2a and 2b are equal to each other—the currents of the brake coils 2a and 2b are, upon opening of the contact B, attenuated simultaneously via the attenuation time constant adjustment resistor R1 and the diode D1 and via the attenuation time constant adjustment resistor R2 and the diode D2, respectively. Thus, the two plungers 1a and 1b are operated simultaneously (i.e., move upward urged by the springs 51 via the levers 50 and the cams 3a and 3b) so that the braking shoes 52 bear on the brake wheel 53 simultaneously from the left and the right, thereby arresting the motion thereof. Since the normal deceleration and stopping during the automatic operations are controlled almost to the complete stop by means of the electric braking effected by the electric motor, it is preferred in the case of the drum-type brake, etc., that the two brake shoes, etc., are activated simultaneously during the normal operations so as to suppress the mechanical stresses acting on the shaft of the motor.

During inspection operation stops, etc., on the other hand, the contact P is closed. Upon opening of the contact B at such stop time, the excitation current through the brake coil 2a is attenuated within a the relatively short period determined by the attenuation time constant which is equal to the ratio L/R of the inductance L of the brake coil 2a to the resistance R equal to:

R1+(the resistance of the brake coil).

The plunger 1a thus starts to operate relatively in a short time, thereby activating the brake shoe 52 operatively coupled therewith. On the other hand, since the contact P is closed, the above-mentioned attenuation time constant adjustment circuit including the resistor R3 is coupled across the brake coil 2b, so that the attenuating action of the resistor R2 is weakened by the resistor R3 coupled in parallel therewith. Thus, the excitation current flowing through the brake coil 2b is attenuated only after a relatively long time determined by the attenuation time constant which is equal to the ratio L/R' of the inductance L of the brake coil 2b to the resistance R' that is approximately equal to:

R2·R3/(R2+R3)+(the coil resistance of the brake coil 2b).

Hence, the plunger 1b starts to operate with a time lag or delay with respect to the operation of the plunger 1a.

As is apparent from above, since, at the inspection operation stops and the automatic operation emergency stops, the plungers 1a and 1b are differentiated in operation timings thereof, so that, in the case of a drum-type brake, the driving shaft is acted on by a lateral force during the brake operation time, which is clearly not preferable. However, the number of such operations is small, and forces act simultaneously both from the right and the left during the normal automatic operations. Thus, there is no practical problem with regard to the mechanical stress acting on the driving shaft.

In in FIG. 6, the attenuation time constant modification circuit is provided only for the brake coil 2b; however, it may be provided for the brake coil 2a, or for both the brake coils 2a and 2b, when necessary. As is apparent from the description above, this invention has the advantage that the braking torque is increased succesively so that the deceleration of the elevator cage becomes smooth, whereby the safety and the efficiency of the maintenance and inspection operations are enhanced.

While description has been made of the particular embodiments of this invention, it will be understood that many modifications may be made without departing from the spirit thereof. The appended claimed are contemplated to cover any such modifications as fall within the true spirit and scope of this invention.

What is claimed is:

1. A braking device for an elevator comprising:
   an electromagnetic brake including two plungers capable of separate operations, and brake coils for attracting the respective plungers; and
   a brake coil exciting circuit for differentiating the operation timings of the two plungers.

2. An electromagnetic braking device for arresting the movement of a driving shaft of an elevator comprising:
   a plurality of plungers capable of separate operations;
   a plurality of brake coils provided for the respective plungers for attracting the plungers;
   a brake coil exciting circuit which differentiate the states of current flowing through the brake coils, thereby differentiating the operation timings of the plurality of plungers.

3. An electromagnetic braking device for arresting the movement of a driving shaft of an elevator comprising:
   a plurality of brake shoes for arresting a motion of a brake wheel coupled to the driving shaft of the elevator;
   a plurality of plungers, provided for the respective brake shoes, to be capable of separate operations;
   a plurality of brake coils provided for the respective plungers for attracting the plungers;
   a brake coil exciting circuit which differentiate the states of current flowing through the brake coils, thereby differentiating the operation timings of the plurality of plungers, so that the timings at which the respective brake shoes arrest the movement of the brake wheel are differentiated.

4. A braking device for an elevator as claimed in claim 1, wherein said brake coil exciting circuit differentiates the currents supplied to the brake coils provided for respective plungers.

5. A braking device for an elevator as claimed in claim 2, wherein said brake coil exciting circuit differentiates the currents supplied to the brake coils provided for the respective plungers.

6. A braking device for an elevator as claimed in claim 3, wherein said brake coil exciting circuit differentiates the currents supplied the brake coils provided for the respective plungers.

7. A braking device for an elevator as claimed in claim 1, wherein each brake coil has a different attenuation constant.

8. A braking device for an elevator as claimed in claim 2, wherein each brake coil has a different attenuation constant.

9. A braking device for an elevator as claimed in claim 3, wherein each brake coil has a different attenuation constant.

10. A braking device for an elevator as claimed in claim 1, wherein said brake coil exciting circuit differentiates the timing of the operation of the plurality of plungers during predetermined specific stop operations.

11. A braking device for an elevator as claimed in claim 2, wherein said brake coil exciting circuit differentiates the timing of the operation of the plurality of plungers during predetermined specific stop operations.

12. A braking device for an elevator as claimed in claim 3, wherein said brake coil exciting circuit differentiates the timing of the operation of the plurality of plungers during predetermined specific stop operations.

13. An electromagnetic braking device for arresting the motion of a driving shaft of an elevator comprising:
    a housing;
    arrestor means, mounted to the housing, for arresting the motion of the driving shaft of the elevator;
    at least two cylindrical plungers mounted within the housing to be axially translatable therein separately from each other;
    at least two solenoidal brake coils, each disposed around one of the plungers, for attracting the respective plungers disposed therein to translate the plungers separately in a predetermined axial direction;
    transmission means for transmitting the respective axial translations of the two plungers to said arrestor means, wherein the translations of the plunger caused by the attraction of the brake coils and transmitted by the transmission means to the arrestor means prevent said arrester means from arresting the driving shaft of the elevator; and
    a brake coil exciting circuit for exciting the brake coils, wherein said brake coil exciting circuit differentiates the timings at which the excitations of the brake coils are attenuated, so that the timings at which the plungers cease preventing the arresting action of said arrestor means are differentiated from each other.

14. An electromagnetic braking device as claimed in claim 13, wherein said arrestor means comprises:
    a brake wheel coupled to the driving shaft of a motor of the elevator;
    at least two brake shoes movably mounted to the housing, for bearing on the brake wheel to arrest the motion of the brake wheel; and
    urging means for urging the brake shoes to bear on the brake wheel;
    wherein said transmission means transmits the translations of the plungers to the brake shoes, and the translations of the plungers in said predetermined direction, transmitted via the transmission means, move the brake shoes away from the brake wheel.

15. An electromagnetic braking device as claimed in claim 13, wherein said brake coil exciting circuit differentiates the currents supplied to the respective brake coils, thereby differentiating the timings at which the excitations of the brake coils are attenuated.

16. An electromagnetic braking device as claimed in claim 13, wherein said brake coil exciting circuit differentiates the attenuation time constants of respective circuits including the brake coils, thereby differentiating the timings at which the excitations of the brake coils are attenuated.

17. An electromagnetic braking device as claimed in claim 16, wherein said braking coil exciting circuit comprises a resistor coupled via a contact switch across one of the brake coils for modifying an attenuation constant thereof.

* * * * *